May 5, 1959 B. D. LOUGHLIN 2,885,465

IMAGE-REPRODUCING SYSTEM FOR A COLOR-TELEVISION RECEIVER

Filed April 19, 1954 4 Sheets-Sheet 1

May 5, 1959 B. D. LOUGHLIN 2,885,465

IMAGE-REPRODUCING SYSTEM FOR A COLOR-TELEVISION RECEIVER

Filed April 19, 1954 4 Sheets-Sheet 4

United States Patent Office 2,885,465

Patented May 5, 1959

2,885,465

IMAGE-REPRODUCING SYSTEM FOR A COLOR-TELEVISION RECEIVER

Bernard D. Loughlin, Lynbrook, N.Y., assignor to Hazeltine Research, Inc., Chicago, Ill., a corporation of Illinois Application April 19, 1954, Serial No. 423,998

18 Claims. (Cl. 178—5.4)

*General*

The present invention is directed to image-reproducing systems for color-television receivers, and particularly, to such reproducing systems in a compatible color-television receiver utilizing a picture tube having a single electron gun for reproducing either color or monochrome images.

In the form of color-television system now standard in the United States, information representative of a scene in color being televised is utilized to develop at the transmitter two substantially simultaneous signals, one of which is primarily representative of the brightness or luminance and the other of which is representative of the chromaticity of the image. The latter signal is a subcarrier wave signal the frequency of which is within the band width of the brightness signal. This subcarrier wave signal has successive cycles each modulated at predetermined phases by signal components representative of primary colors and thus is effectively modulated by components representative of the color information to be added to the luminance to provide complete color information, that is, is effectively modulated by components representative of color saturation and hue. The composite video-frequency signal comprising the brightness signal and the modulated subcarrier wave signal, developed by the National Television System Committee (NTSC) for the translation of information representative of the color of the televised image, is the standardized signal for color television and will be referred to hereinafter as the NTSC signal. This composite signal is utilized to modulate a conventional radio-frequency carrier-wave signal.

A receiver in such system, more completely described in the January 1954 issue of the Proceedings of the Institute of Radio Engineers (IRE) at pages 334–343, inclusive, intercepts the radio-frequency signal and derives the NTSC video-frequency signal therefrom. One type of such receiver includes a pair of principal channels for applying the brightness and chrominance information to an image-reproducing device in the receiver. The channel for translating the brightness signal is substantially the same as the video-frequency amplifier portion of a conventional monochrome receiver. The chrominance signal is translated through the second of such channels and, at least effectively, three color-signal components, individually representative of the three primary hues or colors red, green, and blue of the image, are derived therefrom and are combined with the brightness signal in the image-reproducing device to effect reproduction of the televised image.

One form of image-reproducing device of the type just mentioned conventionally includes a cathode-ray tube having three electron guns, the three color-signal components being individually applied to different ones of the guns while the brightness signal is applied to each thereof. The electron beams emitted from the three guns are utilized individually to excite different ones of three phosphors which effectively develop three primary color images, such images being optically combined to reproduce the televised image. Such a device, because of the utilization of three separate subsidiary channels in the principal chrominance channel for translating the color information to the different phosphors in the cathode-ray tube, is subject to registration problems of the three primary color images developed by such phosphors. Such problems arise from the lack of proper relative alignment of the three electron beams when exciting the phosphors to develop the different color images. As a result, there is a tendency in such device, unless adjustments which tend to be exceptionally fine and critical are made and maintained, to have undesirable overlapping of images causing low definition and spurious color effects especially on the edges of objects therein. Additionally, when utilizing such a device and the inherent three beam circuits in the picture tube for translating both the monochrome and color information, there is a problem of critically balancing the gains of the three channels thereby balancing the relative intensities of the three beams so that they will have proper relative intensities to combine in the cathode-ray tube to reproduce a black and white image over the entire brightness range when only monochrome information is being received. Because of the above-described deficiencies in devices utilizing such multicolor channels, it is preferable to utilize a single-gun picture tube, thereby facilitating the utilization of a single channel for all of the monochrome and color information, provided other complexities in utilizing such tubes do not offset the advantages. By utilizing such single color channel, if the different colors are selected at the image screen of the picture tube, the above-mentioned registration problems are solved and the problem of the above-mentioned critical balancing of the gains of different color channels disappears.

A single-gun tube of a type considered desirable has been described in the Proceedings of the IRE for July 1953, at pages 851–858, inclusive, in an article entitled "The PDF Chromatron—A Single or Multi-Gun Tri-Color Cathode-Ray Tube." This tube, hereinafter referred to as the single-gun tube, will be more fully considered subsequently. However, there is one problem in utilizing such single-gun tube in that the three primary color images are sequentially reproduced by causing the electron beam therein periodically to impinge upon the different phosphors for developing the different component colors of the reproduced image and, as presently defined, the NTSC signal, for reasons to be discussed more fully hereinafter, does not lend itself to direct application to such tube if high-quality color reproduction is to be obtained. In the NTSC signal, the color components modulating the different phases of the subcarrier wave signal are not in proper phase relation and do not have proper relative intensities to cooperate with the impinging of the electron beam on the different phosphors to develop the primary color images. If the NTSC signal is directly applied to such tube, there tend to be color distortion and a loss of constant luminance in the reproduced image.

It has been proposed that such tube be utilized to reproduce a color image from the NTSC signal by initially deriving from such signal before application to the picture tube the signals representative of the three primary colors to obtain three simultaneous color signals. These derived color signals are then sequentially sampled at the correct times to develop a composite signal. The latter signal includes color components which, when applied to the single-gun tube, cooperate with the electron beam as it sequentially impinges on the different color phosphors to cause the different color signals to modulate the intensity of the beam as it impinges on corresponding ones of the color phosphors. Such decoding of the NTSC subcarrier wave signal and re-encoding by means of a sampling device are undesirable since the aforementioned problem of critically balancing the gains of three channels to obtain signals for reproducing desirable black and white images over the brightness range is introduced thereby. It is preferable to modify the NTSC signal directly, that is, without any decoding of the color components thereof so that the modified signal may be directly applied to the single-gun tube to reproduce acceptable color and black and white images. An image-reproducing system for modifying the NTSC signal directly is more fully described in the copending application Serial No. 384,237, filed October 5, 1953, by Bernard D. Loughlin, and entitled "Image-Reproducing System for a Color-Television Receiver," now Patent No. 2,734,940, issued Feb. 14, 1956.

However, though it may be preferable to utilize a system such as described in the latter copending application, for other purposes it may sometimes be advantageous to effect some decoding of the modulation components of the NTSC subcarrier wave signal and then re-encoding of such derived modulation components as modulation components of locally developed subcarrier wave signals. However, the extent of such decoding and re-encoding need not be as great as that previously practiced in the manner described above. The present image-reproducing system is directed to effecting the desired correction of the NTSC subcarrier wave signal by employing a minimum of decoding and re-encoding of the modulation components of such subcarrier wave signal.

It is, therefore, an object of the present invention to provide a new and improved image-reproducing system for a color-television receiver including a single-gun type of picture tube in which the deficiencies of prior such systems when utilizing an NTSC signal are diminished.

It is another object of the present invention to provide a new and improved image-reproducing system for a color-television receiver including a single-gun type of picture tube in which the NTSC signal is utilized in such system with a minimum of decoding and re-encoding of the color components of the NTSC signal.

It is a still further object of the present invention to provide a new and improved image-reproducing system for a color-television receiver including a single-gun type of picture tube in which the NTSC signal is modified prior to application to such tube.

In accordance with the present invention, an image-reproducing system for a color-television receiver comprises circuit means for supplying an NTSC color signal including a first signal primarily representative of the brightness and a modulated subcarrier wave signal representative of the chromaticity of a televised image. The system also comprises a color-image-reproducing apparatus including a multicolor image screen and means for scanning this screen with an electron beam, the scanning means including means for conditioning the apparatus to develop a plurality of colors in a sequence repeating at a predetermined frequency. Further, the image-reproducing system comprises signal-modifying apparatus coupled to the supply circuit and including means responsive to the supplied subcarrier wave signal for developing therefrom another modulated subcarrier wave signal modified with respect thereto. The signal-modifying apparatus also includes means for developing a signal which is a harmonic of the predetermined frequency, means for deriving a modulation component from a predetermined phase of the supplied subcarrier wave signal, and means for utilizing the derived component to modulate the developed harmonic signal. Finally, the image-reproducing system comprises circuit means for applying the aforesaid first signal to said image-reproducing apparatus, and circuit means for applying the aforesaid modified subcarrier wave signal and the aforesaid modulated developed signal to the image-reproducing apparatus for reproducing the color image.

For a better understanding of the present invention, together with other and further objects thereof, reference is had to the following description taken in connection with the accompanying drawings, and its scope will be pointed out in the appended claims.

Referring to the drawings:

Fig. 1 is a schematic diagram of a color-television receiver including an image-reproducing system in accordance with the present invention;

Figs. 2, 2*a*, and 2*b* are diagrams utilized in explaining the operation of the system of Fig. 1;

Figure 1:
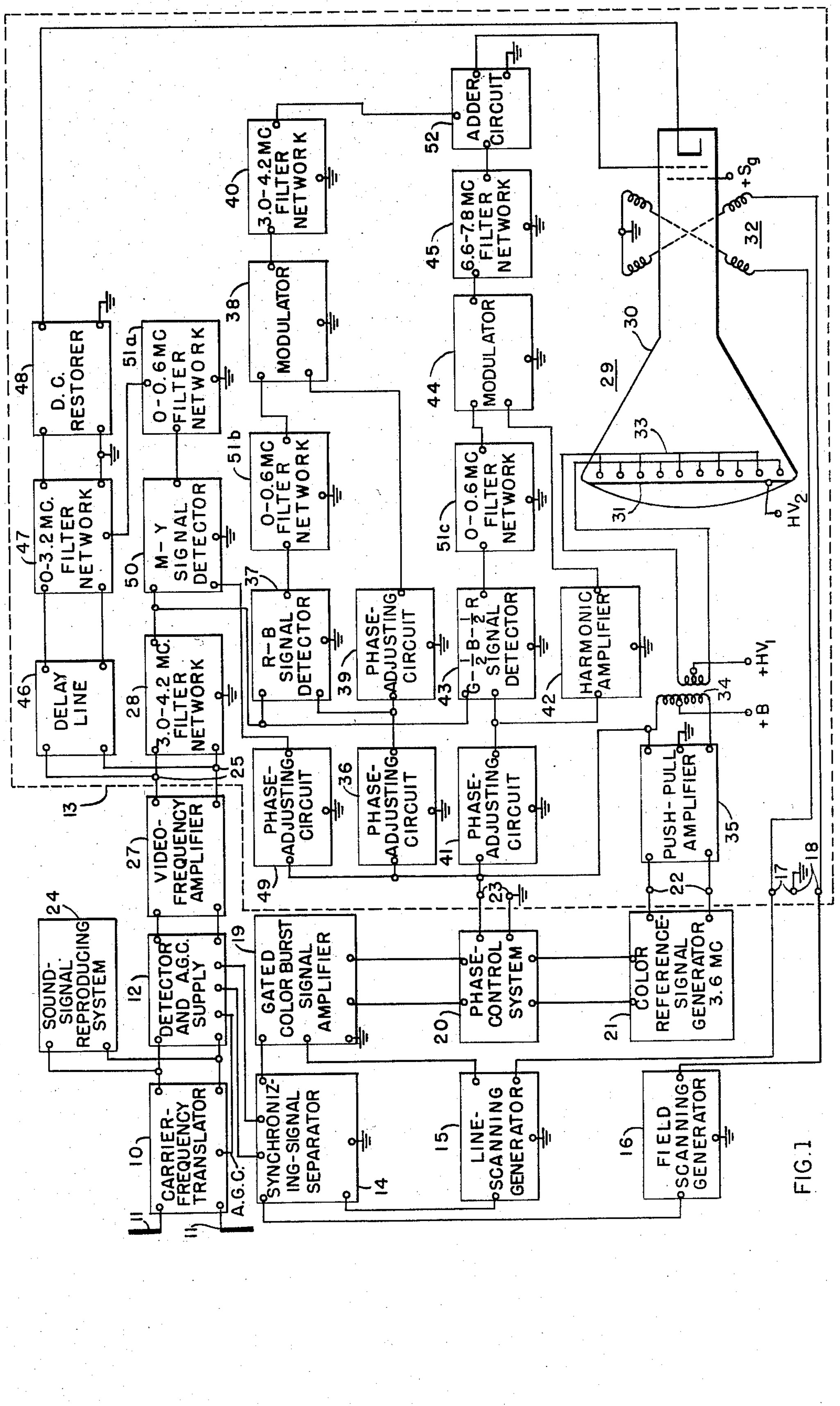

*General description of receiver of Fig. 1*

Referring now to Fig. 1 of the drawings, there is represented a color-television receiver of the superheterodyne type such as may be used in the standard type of color-television system previously discussed herein. The receiver includes a carrier-frequency translator 10 having an input circuit coupled to an antenna system 11. It should be understood that the unit 10 may include in a conventional manner one or more stages of wave-signal amplification, an oscillator-modulator, and one or more stages of intermediate-frequency amplification, if such are desired. Coupled in cascade with the output circuit of the unit 10, in the order named, are a detector and automatic-gain-control (AGC) supply 12, a video-frequency amplifier 27, and an image-reproducing system 13 constructed in accordance with the present invention and to be described more fully hereinafter.

An output circuit of the detector 12 is coupled through a synchronizing-signal separator 14 to a line-scanning generator 15 and a field-scanning generator 16, output circuits of the latter units being coupled, respectively, through the pairs of terminals 17, 17 and 18, 18 to line-deflection and field-deflection windings of the image-reproducing apparatus in the image-reproducing system 13. Additionally, an output circuit of the separator 14 and of the generator 15 is coupled through a gated color burst signal amplifier 19 and a phase-control system 20, in cascade, to a color reference-signal generator 21 for developing a 3.6 megacycle sine-wave signal. The output circuit of the generator 21 is coupled through a pair of terminals 22, 22 to the input circuit of a push-pull amplifier 35 in the image-reproducing system 13, and an input circuit of the phase-control system 20 is coupled through another pair of terminals 23, 23 to the output circuit of the aforementioned push-pull amplifier. The amplifier 19 may be of a conventional gated type for periodically translating a color burst synchronizing signal during its occurrence, and the phase-control system 20 may be a conventional automatic-phase-control system for utilizing the color burst synchronizing signal to control the frequency and phase of the signal developed by the generator 21.

The AGC supply of the unit 12 is connected through the conductor identified as AGC to input terminals of one or more of the stages in the unit 10 to control the gains of such stages to maintain the signal input to the detector 12 within a relatively narrow range for a wide range of received signal intensities. A sound-signal reproducing system 24 is also connected to an output circuit of the unit 10 and it may include stages of intermediate-frequency amplification, a sound-signal detector, stages of audio-frequency amplification, and a sound-reproducing device.

It will be understood that the various units and circuit elements thus far described with the exception of the image-reproducing system 13 may be of conventional construction and design, the details of such units being well known in the art and requiring no further description.

*General operation of receiver of Fig. 1*

Considering briefly now the operation of the receiver of Fig. 1 as a whole and assuming the image-reproducing system 13 to be of a conventional type such as described in the aforesaid article in the January 1954 issue of the IRE, a desired composite television signal of the NTSC type is intercepted by the antenna 11, is selected, amplified, and converted to an intermediate-frequency signal and further amplified in the unit 10 and the video-frequency modulation components thereof are derived in the detector 12 to develop a composite video-frequency signal of the NTSC type. The latter signal comprises synchronizing components, the aforementioned subcarrier wave signal or chromaticity signal, and the aforementioned luminance or brightness signal. The derived video-frequency signal is applied through a pair of terminals 25, 25 to the image-reproducing system 13.

The synchronizing components including line-frequency and field-frequency synchronizing signals, as well as the aforementioned color burst signal for synchronizing the operation of the generator 21, are separated from the other video-frequency components and at least some of such synchronizing signals are separated from each other in the synchronizing-signal separator 14. The line-frequency and field-frequency synchronizing components are applied, respectively, to the units 15 and 16 to synchronize the operation thereof with the operation of related units at the transmitter. These generators supply signals of saw-tooth wave form which are properly synchronized with respect to the transmitted signal and are applied to the line-deflection and field-deflection windings of the color-image-reproducing apparatus in the system 13 to effect a rectilinear scanning of the image screen of the picture tube in such system. The color burst signal, which is substantially a few cycles of an unmodulated portion of the aforementioned subcarrier wave signal and has a desired reference phase with respect to such subcarrier wave signal, is translated through the amplifier 19, when such amplifier is gated on by a line-retrace signal from the generator 15 during the line-blanking period, and is applied to the phase-control system 20 to control the frequency and phase of the signal developed in the generator 21.

In the image-reproducing system 13, as will be described more fully hereinafter, the information representative of the different primary color images is derived from the composite video-frequency signal applied thereto from the output circuit of the detector 12 and is utilized to modulate the intensity of the electron beam in the picture tube in the system 13. This intensity modulation together with other controlling of the beam in the picture tube results in the excitation of the different color phosphors therein in coincidence with the occurrence of information representative of the corresponding ones of the different primary colors to reproduce three primary color images. These primary color images are optically combined to reproduce the complete color image.

The automatic-gain-control or AGC signal developed in the unit 12 is effective to control the amplification of one or more of the stages in the unit 10 thereby to maintain the signal input to the detector 12 and to the sound-signal reproducing system 24 within a relatively narrow range for a wide range of received signal intensities. The sound-signal modulated wave signal, having been selected and amplified in the unit 10, is applied to the sound-signal reproducing system 24. Therein it is amplified and detected to derive the sound-signal modulation components which may be further amplified and then reproduced in the reproducing device of the system 24.

*Description of image-reproducing system of Fig. 1*

The image-reproducing system of Fig. 1 comprises a circuit for supplying an NTSC color signal including a first signal primarily representative of the brightness and a modulated subcarrier wave signal representative of the chromaticity of a televised image. More specifically, such circuit comprises the conductors connecting the output circuit of the video-frequency amplifier 27 through the pair of terminals 25, 25 to input circuits of a delay line 46 and a filter network 28 to be considered more fully hereinafter. The NTSC type of color signal is such as has previously been described herein and the modulated subcarrier wave signal is one which has been modulated at the transmitter at different phases thereof by signals representative of the chromaticity of the image. More specifically, such subcarrier wave signal has successive cycles modulated at phases in each cycle by signal components representative of hue and also modulated in amplitude by components representative of the color saturation of successive elemental areas of the televised image. More complete details of such signal are discussed in the aforementioned January 1954 IRE article.

The image-reproducing system also comprises means for supplying an unmodulated sine-wave signal the frequency of which is, for example, harmonically related to that of the supplied subcarrier wave signal, specifically, the amplifier 35 having the input circuit thereof coupled through the pair of terminals 22, 22 to the generator 21. The system 13 further includes a color-image-reproducing apparatus 29 including a cathode-ray tube 30 having a multi-color image screen 31 and means for scanning the screen with an electron beam, the scanning means including means for conditioning the apparatus 29 to develop a plurality of colors in a sequence repeating at a predetermined frequency that is, at a frequency which is a harmonic of that of the supplied subcarrier wave signal and in which one of the component colors occurs twice. More specifically, the means for scanning the screen 31 with an electron beam includes a conventional electron gun in the cathode-ray tube, conventional line-deflection and field-deflection winding 32, and a grid-like structure 33 parallel to and spaced a short distance from the screen 31 between the electron gun and the screen and having the grid wires thereof coupled through a transformer 34 to the output circuit of a push-pull amplifier 35 and responsive to the signal developed in the unit 35. The elements 33 and 34 in response to the signal developed in the unit 35 comprise means for conditioning the apparatus 29 to develop a plurality of colors in a sequence repeating at a frequency in a manner to be explained more fully hereinafter. More specifically, the picture tube 30 is a single-gun type such as described in the aforesaid article in the July 1953 issue of the IRE. The image screen 31, a fragmentary portion of which is more fully considered hereinafter with respect to curve A of Fig. 2, includes repeating groups of four parallel strips of phosphors individualy for emitting red, green, blue, and green primary colors for reproducing a color image. Such phosphors are hereinafter referred to as the red, green, and blue phosphors. The grid structure 33 comprises two groups of interleaved and parallel conductors which are in a plane parallel with, and to the rear of, the phosphor strips on the screen 31, individual ones of the conductors of one group being positioned behind each of the red phosphor strips and individual ones of the conductors in the group similarly positioned with respect to each of the blue phosphors. One group of conductors is connected to one terminal and the other group to the opposite terminal of the winding of the transformer 34.

The image-reproducing system 13 of Fig. 1 also comprises signal-modifying apparatus coupled to the aforesaid supply circuits, specifically, to the output circuit of the video-frequency amplifier 27 through the network 28 and the pair of terminals 25, 25. The signal-modifying apparatus includes means responsive to the supplied subcarrier wave signal for developing therefrom another modulated subcarrier wave signal modified with respect to the first such wave signal. More specifically, such means includes a signal-modifying circuit having in cascade, and in the order named, an $R-B$ signal detector 37, a low-pass filter network **51*b*, a modulator 38, and a filter network 40 coupled between the unit 28 and an adder circuit 52. This means also includes a phase-adjusting circuit 36 coupled between the push-pull amplifier 35 and the detector 37 and another phase-adjusting circuit 39 coupled between the phase-adjusting circuit 36 and the modulator 38. The network 51*b* has, for example, a pass band of 0–0.6 megacycle while the unit 40 has a pass band of 3.0–4.2 megacycles for such pass band of the unit 51*b* in order to translate a 3.6 megacycle subcarrier wave signal with 0.6 megacycle side bands. However, the pass band of the unit 51*b* may be of the order of 1.3 megacycles if single side-band information is utilized for the $R-B$ component and then the pass band of the unit 40 would be 2.3–4.9 megacycles. Similarly, the pass band of the network 28 will be 3.0–4.2 megacycles if the network 51*b* has a pass band of 0–0.6 megacycle. However, if the network 51*b* has the wider pass band, the unit 28** has a pass band of only 2.3–4.2 megacycles in view of the 4.2 megacycle upper limit of the video-frequency signal. Details of the phase-adjusting circuits, detectors, and modulators will be considered more fully hereinafter.

The signal-modifying apparatus also includes means for developing a signal which is a harmonic of said predetermined frequency, specifically, a phase-adjusting circuit 41 and a harmonic amplifier 42, the input circuit of the unit 41 being coupled to the push-pull amplifier 35. The signal-modifying apparatus also includes another means, specifically, a signal-modifying circuit responsive to the supplied subcarrier wave signal and the developed harmonic signal for deriving a modulation component from a predetermined phase of the supplied subcarrier wave signal. The latter signal-modifying circuit includes, in cascade, in the order named, a signal detector 43 for deriving the modulation component $G-\frac{1}{2}B-\frac{1}{2}R$ and a low-pass filter network **51*c* having a pass band of, for example, 0–0.6 megacycle. The unit 43 has input circuits individually coupled to the output circuits of the phase-adjusting circuit 41 and the filter network 28. The latter signal-modifying circuit also includes means for utilizing the derived component to modulate the developed harmonic signal, more specifically, a modulator 44 having input circuits coupled to the output circuits of the network 51*c* and the harmonic amplifier 42 and an output circuit coupled through a 6.6–7.8 megacycle filter network 45 to an input circuit of the adder circuit 52**.

The signal-modifying apparatus may also include means responsive to the aforesaid first signal and the supplied subcarrier wave signal for developing therefrom a modified first signal. More specifically, the latter means comprises a signal-modifying circuit including in cascade, in the order named, between the pair of input terminals 25, 25 and the cathode of the tube 30, the delay line 46, a 0–3.2 megacycle filter network 47, and a D.-C. restorer 48 for translating the first signal and also includes in cascade, in the order named, between the amplifier 35 and the filter network 47, a phase-adjusting circuit 49, a signal detector 50 for deriving an $M-Y$ component from the modulated subcarrier wave signal, and a 0–0.6 megacycle filter network **51*a*. An input circuit of the detector 50 is coupled to the filter network 28** for applying to the detector the modulated subcarrier wave signal.

The phase-adjusting circuits 36, 39, 41, and 49 may be of any conventional type for effecting relative adjustments of the phases of the 3.6 megacycle signals translated therethrough and developed in the output circuit of the amplifier 35. The need for these relative adjustments and the degree of such adjustments will be more fully explained hereinafter when considering the operation of the image-reproducing system 13. Except for the relative phases of the locally generated signal and the subcarrier wave signal applied thereto, the signal detectors 37, 43, and 50 may be conventional synchronous detectors such as described in the aforementioned article in the January 1954 issue of the IRE for utilizing a locally generated signal having the same frequency as, and specific phases with respect to, the modulated subcarrier wave signal to beat therewith and derive therefrom the components $M-Y$, $R-B$, and $G-\frac{1}{2}B-\frac{1}{2}R$. The filter networks, harmonic amplifier 42, delay line 46, and D.-C. restorer 48 may be of conventional construction.

The image-reproducing system also comprises a circuit for applying the first signal, supplied as a component of the NTSC color signal, and either modified or unmodified, for applying the modified subcarrier wave signal and for applying the modulated developed signal to the image-reproducing apparatus, specifically, the cathode-ray tube 30 for reproducing a color image. Such circuit includes the conductor connecting the output circuit of the D.-C. restorer 48 to the cathode of the cathode-ray tube 30 for applying the first or modified first signal, and includes the combination of the adder circuit 52 and the conductor connected between the output circuit thereof and the intensity control electrode of the cathode-ray tube 30 for applying the modified subcarrier wave signal and the modulated developed signal to the cathode-ray tube 30.

*Explanation of operation of image-reproducing apparatus 13 of Fig. 1*

In considering the operation of the apparatus 13 of Fig. 1, it will be helpful in understanding such operation initially to give some consideration to the need for such apparatus and the problem which it is intended to solve. Basically, the need for such apparatus arises because of the structural and operational differences between a picture tube, such as the three-gun color tube described in the aforesaid article in the January 1954 issue of the IRE which simultaneously reproduces the component colors of an elemental area of an image, and the single-gun tube such as represented by the cathode-ray tube 30 of Fig. 1. Such single-gun tube sequentially reproduces the component colors in a manner now to be considered.

Figure 2:
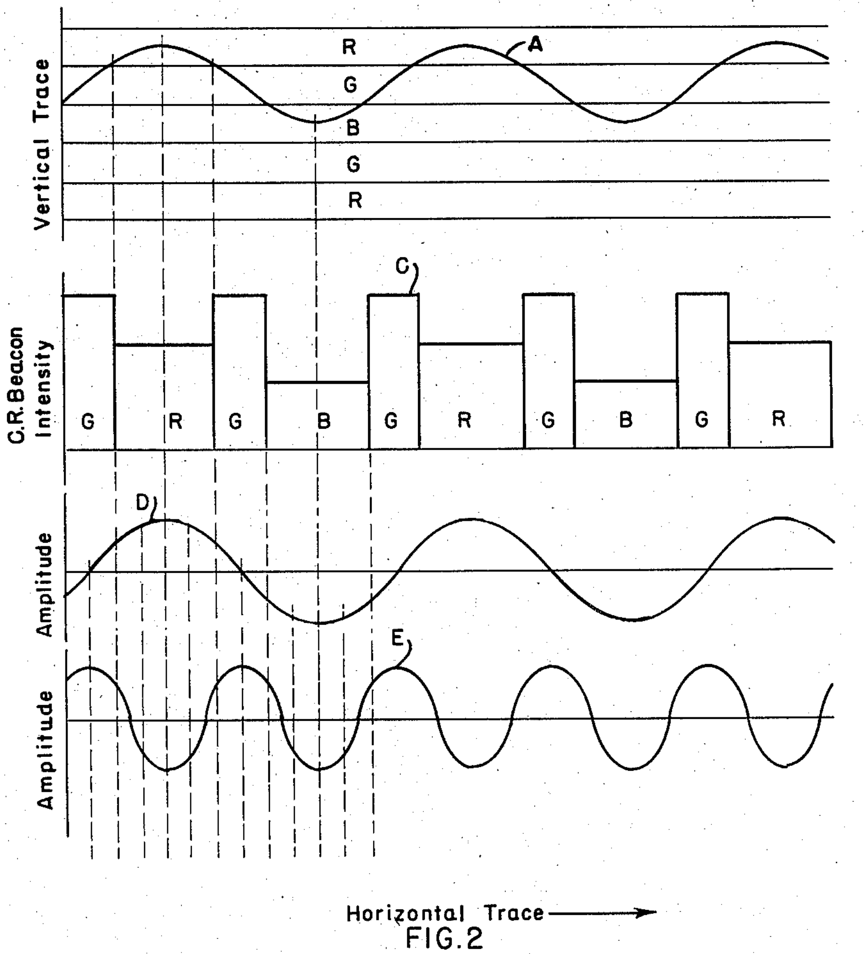

Considering now Fig. 2, curve A represents the path of the electron beam in a cathode-ray tube such as the tube 30 of Fig. 1 as traced across the image screen 31 during the trace of a portion of one horizontal line. Red, green, and blue phosphor strips are identified with respect to curve A of Fig. 2 by the letters R, G, and B, respectively. In a conventional picture tube such a horizontal line would be traced across the screen with a slight downward slope and with no periodic vertical movement such as represented by curve A. The periodic vertical movement is developed by a high-frequency signal applied to the grid-like structure 33 in the cathode-ray tube 30 of Fig. 1 by the amplifier 35. The frequency of the applied signal is, in the embodiment of Fig. 1, substantially equal to that of the subcarrier wave signal and has a definite phase relation with respect thereto as will be discussed more fully hereinafter. The signal applied to the grid structure 33 is normally called a color-switching signal since such vertical movement causes the beam to trace a path through the green, red, green, blue, and again green phosphors in the order named during each period of the applied signal. A composite color is reproduced in an elemental area of the image screen corresponding to one period of the color-switching signal by controlling the intensity of the electron beam as it impinges on each color phosphor. For example, if a desired composite color is to be reproduced in an elemental area, the beam intensity is controlled to cause the proportionate amounts of green, red, and blue to be emitted from the phosphors to combine to reproduce such color. In view of the relationship of the beam intensity to the path traced by such beam on the image screen under the control of the color-switching signal, it is evident that the signal applied to the intensity control circuit of the picture tube should include information defining the relative intensities of the primary colors for each elemental area in synchronism with the impinging of the beam on the color phosphors corresponding to such primary colors. The conventional NTSC color signal does not comply with such requirement and, if it is to be employed, requires modification.

The nature of such modification may be ascertained by first considering the type of composite signal that should be applied to the picture tube to comply with the above requirements. Assuming an arbitrary composite color for an elemental area, the composite signal representing such may be considered to cause the electron beam of the picture tube to have the relative intensities for the different primary colors represented by the pulses C of Fig. 2. Of course, it is understood that such electron beam would not normally have such regularly shaped and discrete current pulses, but that the current-intensity levels would gradually flow from one to another. However, the use of pulses such as represented simplifies the explanation and more vividly indicates the current intensities for the electron beam for the different primary colors. The signal to be applied to the intensity control circuit of the picture tube to cause such relative intensities of the electron-beam current is cyclic and may, thus, be considered in terms of its unidirectional or low-frequency, its fundamental, second, and higher harmonic components.

The pulses C of Fig. 2 may be considered to be composed of pulses of equal duration. For example, the pulses in one cycle of the switching signal commencing with the first pulse G may be considered to be G, R, R, G, B, and B, where each of the red and green pulses represented in Fig. 2 is considered as divided into two pulses each equal in duration to a G pulse. If the pulses C of Fig. 2 are so considered, the unidirectional component $F_0$ of the applied signal may be considered as composed of equal amounts of each of G, R, and B pulses and, thus, may be defined as follows:

$$F_0=\tfrac{1}{3}(G+R+B) \qquad (1)$$

Figure 2A:
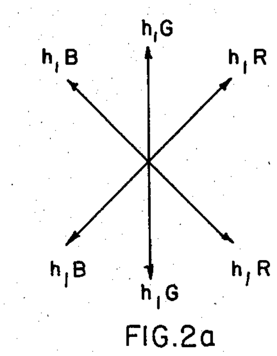

If zero phase for the composite signal is considered to coincide with the time of occurrence of the center of the current pulse representing the first green pulse of Fig. 2, then the current pulses of equal duration will occur with the phase relations and magnitudes $h_1$ represented by the vector diagram of Fig. 2*a* for the fundamental component $F_1$ of the composite signal, that is, for a component having a frequency of approximately 3.6 megacycles. Such fundamental component is represented by curve D of Fig. 2. Examining the vectors of Fig. 2*a*, it is noted that the G vectors cancel and the R and B vectors define the fundamental component as follows:

$$F_1=2\times.866h_1(R-B) \qquad (2)$$

Figure 2B:
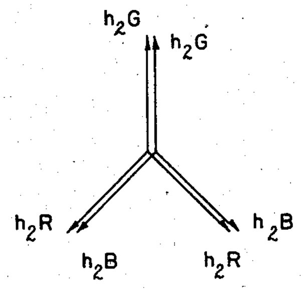

In a similar manner, with respect to a second harmonic component $F_2$, such as represented by curve E of Fig. 2, the current pulses will occur with the phase relations and magnitudes $h_2$ represented by the vectors of Fig. 2*b*. It should be understood that the vectors at the same phase angles actually should be superposed and are represented as offset from one another for ease of representation and explanation. An examination of these vectors indicates that the second harmonic component $F_2$ may be defined as follows:

$$F_2=2\times h_2(G-\tfrac{1}{2}R-\tfrac{1}{2}B) \qquad (3)$$

Higher harmonic terms, not considered herein, are definable in a similar manner if the small amount of additional information contributed by such terms is desired for higher quality reproduction.

Equations 1–3, inclusive, above define the composite signal to be applied to the intensity control circuit, that is, the grid-cathode circuit of the picture tube to cause proper composite colors to be reproduced in elemental areas of a reproduced image. Equation 1 defines the monochrome signal M which is in effect to be translated through the direct-current restorer 48 and applied to the cathode of the picture tube 30. Equations 2 and 3 define modulated fundamental and second harmonic subcarrier wave signals having phase relations such as represented by curves D and E of Fig. 2. The fundamental subcarrier wave signal is to be modulated by an $R-B$ color component, while the second harmonic wave signal is to be modulated by a color component which is more fully defined as $G-\tfrac{1}{2}R-\tfrac{1}{2}B$. The conventional NTSC signal will not directly provide any of the above signals and is modified in the system 13 of Fig. 1 to develop the signals just described.

The NTSC signal includes a monochrome component which is defined as follows:

$$Y=.59G+.30R+.11B \qquad (4)$$

Such a signal is translated through the delay line 46 and applied to the filter network 47. As more fully described in copending application Serial No. 339,145, filed February 26, 1953, by Bernard D. Loughlin, entitled "Color-Television Receiver," such a signal Y can be converted to a signal M by deriving from a predetermined phase of the NTSC subcarrier wave signal a correction signal $M-Y$. The NTSC subcarrier wave signal is translated through the network 28 and applied to the signal detector 50 wherein it heterodynes with a locally generated signal developed in the generator 21 translated through the amplifier 35 and adjusted in phase with respect to the NTSC subcarrier wave signal by the circuit 49 so as to derive the $M-Y$ correction signal from the proper phase of the subcarrier wave signal. The phase angle between the two signals applied to the detector 50 to derive the $M-Y$ signal depends on the composition of the subcarrier wave signal and, specifically, at what phase of such subcarrier wave signal the proper proportions of the color components representative of green, red, and blue are located to comply with the proportions of such to compose the $M-Y$ signal. The phase-adjusting circuit 49 is proportioned to cause the proper phase relation of the signals applied to the detector 50 to derive $M-Y$. The low-frequency component, that is, frequencies in the band of 0–0.6 megacycle of such $M-Y$ correction signal are translated through the network 51a and applied to the network 47 wherein they combine with the signal Y defined by Equation 4 above to develop the signal M defined by Equation 1 above. The latter signal after D.-C. restoration in the unit 48 is applied to the cathode of the picture tube 30 to control the intensity of the electron beam developed therein.

Figure 3:
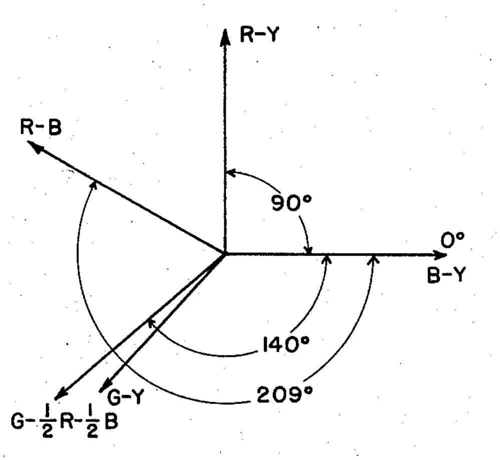
Fig. 3 is a vector diagram utilized in explaining the operation of the system of Fig. 1.

The fundamental and second harmonic subcarrier wave signals modulated, respectively, by the R—B and $G-\tfrac{1}{2}R-\tfrac{1}{2}B$ color components are developed from the NTSC subcarrier wave signal. Fig. 3 represents in vector form the color components $R-Y$, $B-Y$, and $G-Y$ which are ultimately developed from the NTSC subcarrier wave signal in conventional color-television receivers. Fig. 3 also represents in vector form the phases at which the color components $R-B$ and $G-\tfrac{1}{2}R-\tfrac{1}{2}B$ are to be found on the subcarrier wave signal. With the $B-Y$ component considered as the reference phase of zero, the $G-\tfrac{1}{2}R-\tfrac{1}{2}B$ component is approximately 140° in phase behind such $B-Y$ component, and the $R-B$ component is approximately 209° behind the $B-Y$ component. The signal developed in the generator 21 and translated through the amplifier 35 is controlled so as to have some predetermined phase with respect to a reference component such as *B—Y*. Consequently, the phase-adjusting circuit 36 is proportioned to modify the phase of the signal applied thereto by the amplifier 35 an amount such that this phase modification, with that inherent in the circuits through which the modulated subcarrier wave signal and the locally generated signal are translated, will combine to provide the 209° difference in phase necessary to cause the signal detector 37 to derive the *R—B* component. This *R—B* component is then applied through the filter network **51*b* to a modulator 38 to modulate a subcarrier wave signal of approximately 3.6 megacycles having the phase relation represented by curve D of Fig. 2 with respect to the color-switching signal represented by curve A of Fig. 2. Such phase relation is obtained by proportioning the phease-adjusting circuit 39 to apply a signal having the phase represented by curve D of Fig. 2 to the modulator 38. The modulated subcarrier wave signal developed in the unit 38 is translated through the filter network 40 and applied to the adder circuit 52**.

In a manner similar to that by which the fundamental subcarrier wave signal is developed, the second harmonic subcarrier wave signal modulated by the *G—½B—½R* color component is also developed. The phase-adjusting circuit 41 causes the NTSC subcarrier wave signal and the locally generated signal to heterodyne in the detector 43 with the phase relation of 140° as represented by Fig. 3 to derive the *G—½R—½B* color component. The harmonic amplifier 42 doubles the frequency of the 3.6 megacycle signal applied from the output circuit of the unit 41 and adjusts the phase thereof so that it has a phase such as represented by curve E of Fig. 2. This second harmonic signal after translation through the network **51*c* is modulated in the unit 44** by the *G—½B—½R* color component and the modulated second harmonic signal is translated through the network 45 and applied to the adder circuit 52. In the unit 52, the latter signal is combined with the fundamental subcarrier wave signal, and the combined signal in the output circuit of the unit 52 is applied to the grid of the cathode-ray tube 30 to control the intensity of the electron beam developed therein. With the monochrome signal applied to the cathode of the tube 30 and the fundamental and second harmonic wave signals modulated, respectively, by *R—B* and *G—½B—½R* color components applied to the grid of such tube, proper composite colors are developed in the reproduced image for the reasons more fully discussed previously herein.

It should be noted that the NTSC video-frequency signal has been modified to a signal which may be utilized with a cathode-ray tube of the type of the tube 30 of Fig. 1 with a minimum of derivation of the components of the NTSC signal. Though an *M—Y* correction signal has been described as being derived to correct the monochrome signal, such correction may not be effected if less accuracy in correction is acceptable and, therefore, the sole derivation in the embodiment of Fig. 1 may be that of the color components *R—B* and *G—½R—½B* which are utilized, without further matrixing or modification, to modulate locally developed subcarrier wave signals.

Figure 4:
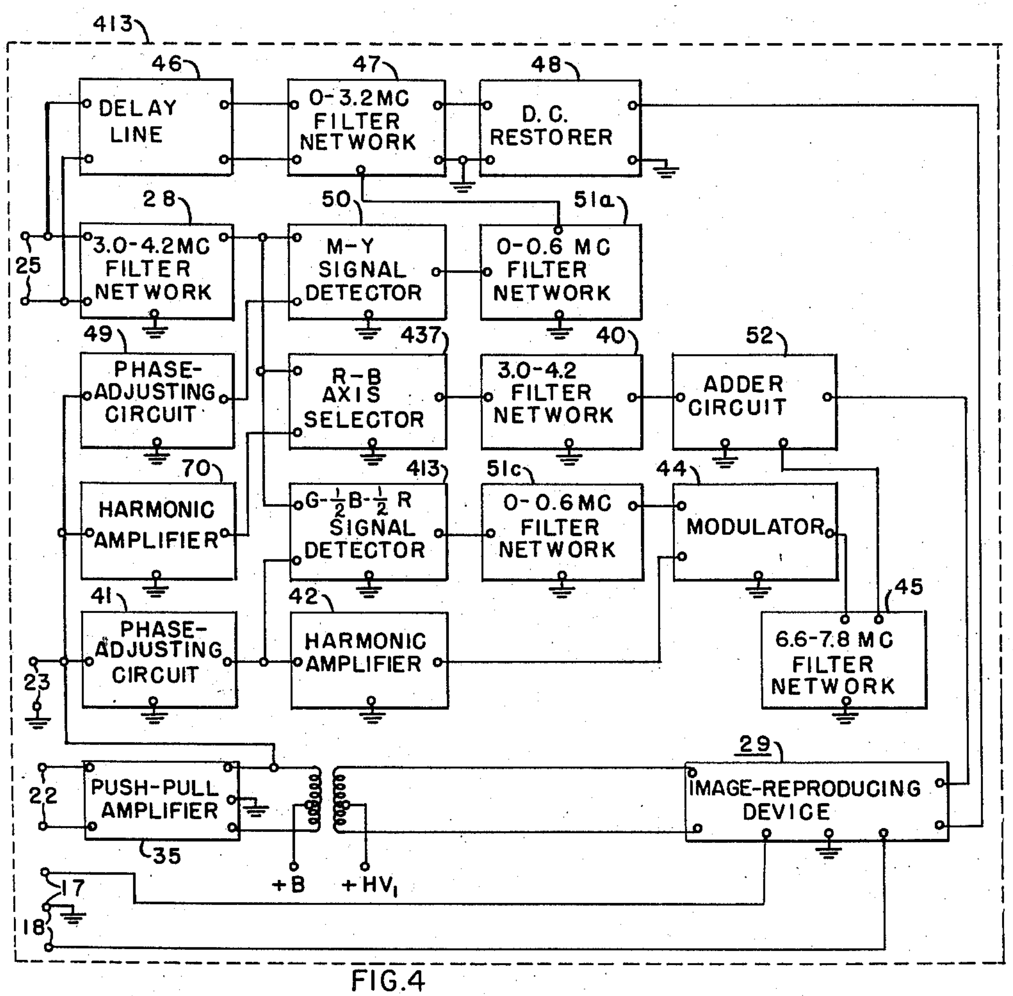
Fig. 4 is a schematic diagram of a modified form of the image-reproducing system of Fig. 1.

*Description and explanation of operation of image-reproducing system of Fig. 4*

Fig. 4 represents another embodiment of the image-reproducing system and differs from the embodiment of Fig. 1 principally in that axis selection of the *R—B* components, in accordance with the techniques more fully described in applicant's copending application Serial No. 384,237, is employed rather than the derivation of a low-frequency *R—B* component. Since the system of Fig. 4 is similar to that of Fig. 1, units which are the same in these systems are designated by the same reference numerals, and units in the system of Fig. 4 which are analogous to units in that of Fig. 1 are designated by the reference numerals employed in Fig. 1 with the addition of "400" thereto.

The system 413 of Fig. 4 differs from the system 13 of Fig. 1 solely in the utilization of an *R—B* axis selector 437 in the system 413 instead of the *R—B* signal detector 37, the filter network **51*b*, modulator 38, and phase-adjusting circuit 39 in the system 13 of Fig. 1. The use of axis selection also requires a second harmonic heterodyning signal and thus a harmonic amplifier 70** is employed instead of a simple phase-adjusting circuit. As more fully described in the copending application Serial No. 384,237, that axis of the subcarrier wave signal along which the *R—B* component is found may be selected by means of conventional synchronous modulator techniques, while the information on the quadrature axis of such subcarrier wave signal may be rejected. The signal information selected along the desired axis, which is that including the vector *R—B* of Fig. 3, results in a subcarrier wave signal in the output circuit of the axis selector which has the frequency of the NTSC subcarrier wave signal and includes as a modulation component the *R—B* color component. As pointed out with respect to the system 13 of Fig. 1, one of the signals required for utilization in an image-reproducing device such as the device 29 of Fig. 1 is a signal having the same frequency as the NTSC subcarrier wave signal and including solely *R—B* information. The signal in the output circuit of the axis selector 437 complies with such requirement providing such a fundamental subcarrier wave signal.

Except for the development of the fundamental subcarrier wave signal modulated by the *R—B* component as described above, the system 413 of Fig. 4 operates in a manner similar to that of the system 13 of Fig. 1 and, therefore, no further explanation of such operation is considered necessary.

Figure 5:
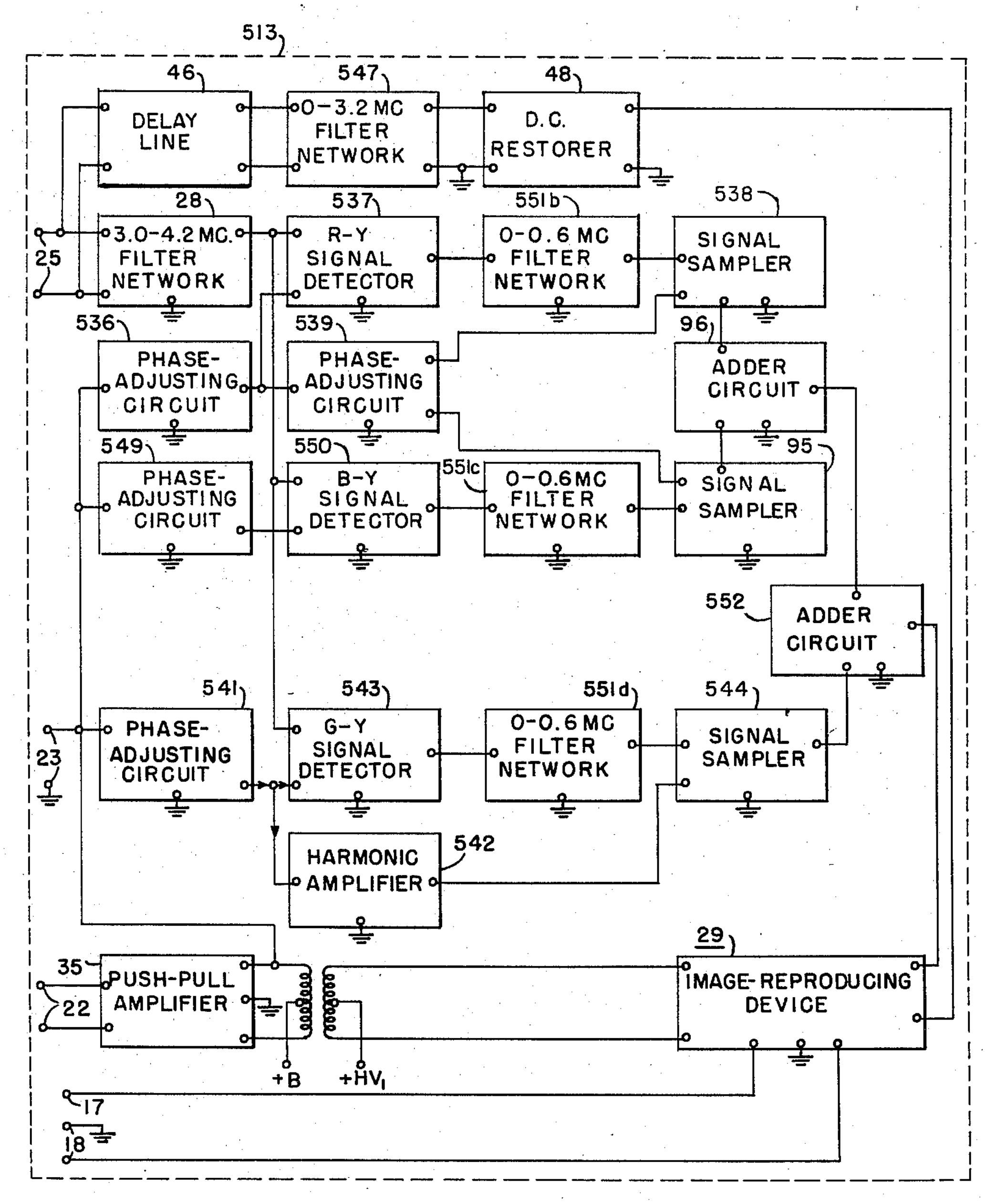
Fig. 5 is a schematic diagram of another modified form of the image-reproducing system of Fig. 1.

*Description and explanation of operation of image-reproducing system of Fig. 5*

Fig. 5 represents still another image-reproducing system for developing a composite signal suitable for utilization in an image-reproducing device such as the device 29 of Fig. 1. The system 513 of Fig. 5 is similar to the system 13 of Fig. 1 and, therefore, units which are the same in these systems are designated by the same reference numerals. However, many of the units in the system of Fig. 5, though analogous to units in the system 13 of Fig. 1, differ from corresponding ones of such units in the system of Fig. 1 because of the proportioning of some of the circuit elements thereof, rather than in structure and, additionally, in manner of operation. Such analogous units in the system 513 of Fig. 5 are designated by the reference numerals in the corresponding units of the system 13 of Fig. 1 with the addition of "500" thereto.

In the system 513 of Fig. 5 the channel including the units 46, 547, and 48 for translating the monochrome signal translates the signal Y defined by Equation 4 above rather than the modified first signal M. That is, no correction signal *M—Y* is developed for combination with the Y signal in the network 547, such *M—Y* signal being developed in other channels in a manner to be explained. By techniques previously described herein, instead of deriving the components *R—B* and *G—½R—½B* directly as described with reference to the system 13 of Fig. 1, the components *R—Y*, *B—Y*, and *G—Y* are derived in the units 537, 550, and 543 in the well-known manner. Since the components *R—Y*, *B—Y*, and *G—Y*, as represented by the vectors of Fig. 3, are at different phases from the components *R—B* and *G—½R—½B*, the phase adjustments effected by the circuits 536, 549, and 541 differ from the adjustments effected by the corresponding units in the system 13 of Fig. 1. For a similar reason, the harmonic amplifier 542 and the sampler 544 differ from the corresponding units in Fig. 1.

The system 513 of Fig. 5 utilizes conventional signal-sampling circuits such as the units 538, 95, and 544 in place of modulators as in the prior embodiments. Such samplers have the well-known characteristics of effecting a time sampling of a continuous signal at predetermined times and translating at such times unidirectional, fundamental and higher frequency components of the sampled signal. The samplers 538 and 95 are controlled by the 3.6 megacycle signal applied thereto through the phase-adjusting circuits 536 and 539 to sample the $R-Y$ and $B-Y$ derived signals at times which differ by the equivalent of 180° in phase of the sampling signal. The sampling times for $R-Y$ and $B-Y$ are related to the times at which the color-switching signal applied to the image-reproducing device 29 causes the electron beam of such device to impinge on the red and blue phosphors as previously explained herein. Similarly, the sampler 544 is controlled to effect sampling at a 7.2 megacycle rate, that is, at twice the color-switching frequency, at times corresponding to those at which the color-switching signal causes the beam to impinge on the green phosphors.

It has been mentioned that such samplers translate unidirectional, fundamental, and higher frequency components. The operation of the three samplers 538, 95, and 544 is such that each effects a sampling at different times of the sampling cycle, each sampling having a net duty cycle of one third. Such sampling effects translation of a unidirectional component $f_0$ definable as follows:

$$f_0=\tfrac{1}{3}(R-Y)+\tfrac{1}{3}(G-Y)+\tfrac{1}{3}(B-Y) \qquad (5)$$

Since the monochrome signal M is defined as:

$$M=\tfrac{1}{3}R+\tfrac{1}{3}G+\tfrac{1}{3}B \qquad (6)$$

the component $f_0$ is the $M-Y$ correction signal previously considered herein.

The samplers 538 and 95 translate components at the fundamental frequency 3.6 megacycles, while the sampler 544 operates at a rate twice such frequency and translates no component at such frequency. The 180° phase relation of the operation of the units 538 and 95, that is, a difference in the time of operation thereof equal to 180° at a frequency of 3.6 megacycles, causes the sampled signals therefrom as applied to the adder circuit 96 to be positive and negative in sense and, thus, causes the $R-Y$ and $B-Y$ sampled signals to combine into an $R-B$ signal which is applied to the adder circuit 552. The sampler 544 operating at twice the rate of the samplers 538 and 95 develops a second harmonic term including a $G-Y$ component, while the second harmonic terms inherently developed by the samplers 538 and 95 are lesser amplitude $R-Y$ and $B-Y$ terms. When the second harmonic $G-Y$, $R-Y$, and $B-Y$ terms are combined in the adder circuit 552, the second harmonic component $G-\tfrac{1}{2}R-\tfrac{1}{2}B$ is developed. To summarize the operation of the system 513 of Fig. 5, the samplers 538, 95, and 544 combine in operation to develop the $M-Y$ correction signal. The samplers 538 and 95 combine in operation to develop the $R-B$ fundamental signal and the samplers 538, 95, and 544 combine to develop a second harmonic component $G-\tfrac{1}{2}R-\tfrac{1}{2}B$. These components are combined into a composite signal in the adder circuit 552 and the composite signal is applied to the image-reproducing device 29 to effect reproduction of a televised image in the manner previously described herein with reference to Fig. 1.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An image-reproducing system for a color-television receiver comprising: circuit means for supplying an NTSC color signal including a first signal primarily representative of the brightness and a modulated sub-carrier wave signal representative of the chromaticity of a televised image; color-image-reproducing apparatus including a multicolor image screen and means for scanning said screen with an electron beam, said scanning means including means for conditioning said apparatus to develop a plurality of colors in a sequence repeating at a predetermined frequency; signal-modifying apparatus coupled to said supply circuit including means responsive to said supplied subcarrier wave signal for developing therefrom another modulated subcarrier wave signal modified with respect thereto, means for developing a signal which is a harmonic of said predetermined frequency, means for deriving a modulation component from a predetermined phase of said supplied subcarrier wave signal, and means for utilizing said derived component to modulate said developed harmonic signal; circuit means for applying said first signal to said image-reproducing apparatus, and circuit means for applying said modified subcarrier wave signal and said modulated developed signal to said image-reproducing apparatus for reproducing a color image.

2. An image-reproducing system for a color-television receiver comprising: a circuit for supplying an NTSC color signal including a first signal primarily representative of the brightness and a modulated subcarrier wave signal representative of the chromaticity of a televised image; a cathode-ray tube apparatus including a multicolor image screen and means for scanning said screen with an electron beam, said scanning means including means for conditioning said apparatus to develop a plurality of colors in a sequence repeating at a predetermined frequency, said apparatus requiring proportions of said subcarrier wave signal at a harmonic of said predetermined frequency to reproduce a color image; signal-modifying apparatus coupled to said supply circuit including means responsive to said supplied subcarrier wave signal for developing therefrom another modulated subcarrier wave signal modified with respect thereto and having said predetermined frequency, means for developing a signal which is a harmonic of said predetermined frequency, means for deriving from a predetermined phase of said supplied subcarrier wave signal a modulation component representing said proportions of said subcarrier wave signal required by said apparatus at said harmonic frequency, and means for utilizing said derived component to modulate said developed harmonic signal; and a circuit for applying said first signal, said modified subcarrier wave signal, and said modulated developed signal to said cathode-ray tube apparatus for reproducing a color image.

3. An image-reproducing system for a color-television receiver comprising: a circuit for supplying an NTSC color signal including a first signal primarily representative of the brightness and a modulated subcarrier wave signal representative of the chromaticity of a televised image; color-image-reproducing apparatus including a multicolor image screen and means for scanning said screen with an electron beam, said scanning means including means for conditioning said apparatus to develop a plurality of colors in a sequence repeating at a harmonic of the frequency of said supplied subcarrier wave signal, said apparatus requiring proportions of said subcarrier wave signal at said harmonic frequency to reproduce a color image; signal-modifying apparatus coupled to said supply circuit including means responsive to said supplied subcarrier wave signal for developing therefrom another modulated subcarrier wave signal modified with respect thereto and having the frequency thereof, means for developing a signal which is a harmonic of said frequency of said supplied subcarrier wave signal, means for deriving from a predetermined phase of said supplied subcarrier wave signal a modulation component representing said proportions of said subcarrier wave signal required by said apparatus at said harmonic frequency, and means for utilizing said derived component to modulate said developed harmonic signal; and a circuit for applying said first signal, said modified subcarrier wave signal, and said modulated developed signal to said apparatus for reproducing a color image.

4. An image-reproducing system for a color-television receiver comprising: a circuit for supplying an NTSC color signal including a first signal primarily representative of the brightness and a modulated subcarrier wave signal representative of the chromaticity of a televised image; color-image-reproducing apparatus including a multicolor image screen and means for scanning said screen with an electron beam, said scanning means including means for conditioning said apparatus to develop a plurality of colors in a sequence repeating at a predetermined frequency, said apparatus requiring proportions of said subcarrier wave signal at a harmonic of said predetermined frequency to reproduce a color image; signal-modifying apparatus coupled to said supply circuit including means responsive to said first signal and said supplied subcarrier wave signal for developing a modified first signal, means responsive to said supplied subcarrier wave signal for developing therefrom another modulated subcarrier wave signal modified with respect thereto, means for developing a signal which is a harmonic of said predetermined frequency, means for deriving from a predetermined phase point of said supplied subcarrier wave signal a modulation component representing said proportions of said subcarrier wave signal required by said apparatus at said harmonic frequency, and means for utilizing said derived component to modulate said developed harmonic signal; and a circuit for applying said modified first signal, said modified subcarrier wave signal, and said modulated developed signal to said apparatus for reproducing a color image.

5. An image-reproducing system for a color-television receiver comprising: a circuit for supplying an NTSC color signal including a first signal primarily representative of the brightness and a modulated subcarrier wave signal representative of the chromaticity of a televised image; color-image-reproducing apparatus including a multicolor image screen and means for scanning said screen with an electron beam, said scanning means including means for conditioning said apparatus to develop a plurality of colors in a sequence repeating at a predetermined frequency, said apparatus requiring proportions of said subcarrier wave signal at a harmonic of said predetermined frequency to reproduce a color image; signal-modifying apparatus coupled to said supply circuit including means responsive to said supplied subcarrier wave signal for developing a modified modulated subcarrier wave signal from said portion, means for developing a signal which is a harmonic of said predetermined frequency, means for deriving from a predetermined phase point of said supplied subcarrier wave signal a modulation component representing said proportions of said subcarrier wave signal required by said apparatus at said harmonic frequency, and means for utilizing said derived component to modulate said developed harmonic signal; and a circuit for applying said first signal, said modified subcarrier wave signal, and said modulated developed signal to said apparatus for reproducing a color image.

6. An image-reproducing system for a color-television receiver comprising: a circuit for supplying an NTSC color signal including a first signal primarily representative of the brightness and a modulated subcarrier wave signal representative of the chromaticity of a televised image; color-image-reproducing apparatus including a multicolor image screen and means for scanning said screen with an electron beam, said scanning means including means for conditioning said apparatus to develop a plurality of colors in a sequence repeating at a predetermined frequency, said apparatus requiring proportions of said subcarrier wave signal at said predetermined frequency and at the second harmonic of said predetermined frequency to reproduce a color image; signal-modifying apparatus coupled to said supply circuit including means for developing a pair of signals one of which has said predetermined frequency and the other of which is a harmonic of said predetermined frequency, means for deriving from different phase points of said supplied subcarrier wave signal a pair of modulation components representing proportions of said subcarrier wave signal required by said color-image-reproducing apparatus at said predetermined and second harmonic frequencies, and means for utilizing said derived components individually to modulate different ones of said pair of developed signals; and a circuit for applying said first signal and said pair of modulated developed signals to said apparatus for reproducing a color image.

7. An image-reproducing system for a color-television receiver comprising: a circuit for supplying an NTSC color signal including a first signal primarily representative of the brightness and a modulated subcarrier wave signal representative of the chromaticity of a televised image; color-image-reproducing apparatus including a multicolor image screen and means for scanning said screen with an electron beam, said scanning means including means for conditioning said apparatus to develop a plurality of colors in a sequence repeating at a predetermined frequency, said apparatus requiring proportions of said subcarrier wave signal at a harmonic of said predetermined frequency to reproduce a color image; a signal-modifying circuit responsive to said supplied subcarrier wave signal for developing therefrom another subcarrier wave signal modified with respect thereto and modulated at a predetermined phase by a selected one of the modulation components of said supplied subcarrier wave signal; means for developing a signal which is a harmonic of said predetermined frequency; a signal-modifying circuit responsive to said supplied subcarrier wave signal for deriving from a predetermined phase thereof a modulation component representing said proportions of said subcarrier wave signal required by said apparatus at said harmonic frequency and responsive to said harmonic signal for utilizing said derived component to modulate said developed harmonic signal; and a circuit for applying said first signal, said modified subcarrier wave signal, and said modulated harmonic signal to said apparatus for reproducing a color image.

8. An image-reproducing system for a color-television receiver comprising: a circuit for supplying an NTSC color signal including a first signal primarily representative of the brightness and a modulated subcarrier wave signal representative of the chromaticity of a televised image; color-image-reproducing apparatus including a multicolor image screen and means for scanning said screen with an electron beam, said scanning means including means for conditioning said apparatus to develop a plurality of colors in a sequence repeating at a predetermined frequency, said apparatus requiring proportions of said subcarrier wave signal at a harmonic of said predetermined frequency to reproduce a color image; a signal-modifying circuit coupled to said supply circuit and responsive to said first and said supplied subcarrier wave signals for developing a signal from said supplied subcarrier wave signal and including means for combining said developed signal with said first signal to develop a modified first signal; another signal-modifying circuit responsive to said supplied subcarrier wave signal for developing therefrom another subcarrier wave signal modified with respect thereto and modulated at a predetermined phase by a selected one of the modulation components of said supplied subcarrier wave signal; means for developing a signal which is a harmonic of said predeterminde frequency; a third signal-modifying circuit responsive to said supplied subcarrier wave signal for deriving from a predetermined phase thereof a modulation component representing said proportions of said subcarrier wave signal required by said apparatus at said harmonic frequency and responsive to said harmonic signal for utilizing said derived component to modulate said developed harmonic signal; and a circuit for applying said modified first signal, said modified subcarrier wave signal, and said modulated harmonic signal to said apparatus for reproducing a color image.

9. An image-reproducing system for a color-television receiver comprising: a circuit for supplying an NTSC color signal including a first signal primarily representative of the brightness and a modulated subcarrier wave signal representative of the chromaticity of a televised image; color-image-reproducing apparatus including a multicolor image screen and means for scanning said screen with an electron beam, said scanning means including means for conditioning said apparatus to develop a plurality of colors in a sequence repeating at a predetermined frequency, said apparatus requiring proportions of said subcarrier wave signal at a harmonic of said predetermined frequency to reproduce a color image; a signal-modifying circuit coupled to said supply circuit and responsive to said first and said supplied subcarrier wave signals and including a detector for deriving a modulation signal from said supplied subcarrier wave signal and including means for combining said derived signal with said first signal to develop a modified first signal; another signal-modifying circuit responsive to said supplied subcarrier wave signal for developing therefrom another subcarrier wave signal modified with respect thereto and modulated at a predetermined phase by a selected one of the modulation components of said supplied subcarrier wave signal; means for developing a signal which is a harmonic of said predetermined frequency; a third signal-modifying circuit responsive to said supplied subcarrier wave signal for deriving from a predetermined phase thereof a modulation component representing said proportions of said subcarrier wave signal required by said apparatus at said harmonic frequency and responsive to said harmonic signal for utilizing said derived component to modulate said developed harmonic signal; and a circuit for applying said modified first signal, said modified subcarrier wave signal, and said modulated harmonic signal to said apparatus for reproducing a color image.

10. An image-reproducing system for a color-television receiver comprising: a circuit for supplying an NTSC color signal including a first signal primarily representative of the brightness and a modulated subcarrier wave signal representative of the chromaticity of a televised image; color-image-reproducing apparatus including a multicolor image screen and means for scanning said screen with an electron beam, said scanning means including means for conditioning said apparatus to develop a plurality of colors in a sequence repeating at a predetermined frequency, said apparatus requiring proportions of said subcarrier wave signal at a harmonic of said predetermined frequency to reproduce a color image; a signal-modifying circuit responsive to said supplied subcarrier wave signal and including a detector for deriving a modulation signal from said modulated subcarrier wave signal and means for utilizing said derived signal to develop a modified subcarrier wave signal modulated at a predetermined phase by said derived modulation signal; means for developing a signal which is a harmonic of said predetermined frequency; a signal-modifying circuit responsive to said supplied subcarrier wave signal for deriving from a predetermined phase thereof a modulation component representing said proportions of said subcarrier wave signal required by said apparatus at said harmonic frequency and responsive to said harmonic signal for utilizing said derived component to modulate said developed harmonic signal; and a circuit for applying said first signal, said modified subcarrier wave signal, and said modulated harmonic signal to said apparatus for reproducing a color image.

11. An image-reproducing system for a color-television receiver comprising: a circuit for supplying an NTSC color signal including a first signal primarily representative of the brightness and a modulated subcarrier wave signal representative of the chromaticity of a televised image; color-image-reproducing apparatus including a multicolor image screen and means for scanning said screen with an electron beam, said scanning means including means for conditioning said apparatus to develop a plurality of colors in a sequence repeating at a predetermined frequency, said apparatus requiring proportions of said subcarrier wave signal at a harmonic of said predetermined frequency to reproduce a color image; a signal-modifying circuit coupled to said supply circuit and responsive to said first and said supplied subcarrier wave signals for developing a signal from said supplied subcarrier wave signal and including means for combining said developed signal with said first signal to develop a modified first signal; another signal-modifying circuit responsive to said supplied subcarrier wave signal and including a detector for deriving a modulation signal from said modulated subcarrier wave signal and means for utilizing said derived signal to develop a modified subcarrier wave signal modulated at a predetermined phase by said derived modulation signal; means for developing a signal which is a harmonic of said predetermined frequency; a third signal-modifying circuit responsive to said supplied subcarrier wave signal for deriving from a predetermined phase thereof a modulation component representing said proportions of said subcarrier wave signal required by said apparatus at said harmonic frequency and responsive to said harmonic signal for utilizing said derived component to modulate said developed harmonic signal; and a circuit for applying said modified first signal, said modified subcarrier wave signal, and said modulated harmonic signal to said apparatus for reproducing a color image.

12. An image-reproducing system for a color-television receiver comprising: a circuit for supplying an NTSC color signal including a first signal primarily representative of the brightness and a modulated subcarrier wave signal representative of the chromaticity of a televised image; means for generating an unmodulated sine-wave signal; color-image-reproducing apparatus including a multicolor image screen and means for scanning said screen with an electron beam, said scanning means including means for conditioning said apparatus to develop a plurality of colors in a sequence repeating at a predetermined frequency, said apparatus requiring proportions of said subcarrier wave signal at a harmonic of said predetermined frequency to reproduce a color image; a signal-modifying circuit responsive to said supplied subcarrier wave signal and including a detector for deriving a modulation signal from said modulated subcarrier wave signal and a modulator responsive to said generated signal and said derived signal for developing therefrom a modified subcarrier wave signal modulated at a predetermined phase by said derived modulation signal; means for developing a signal which is a harmonic of said predetermined frequency; a signal-modifying circuit responsive to said supplied subcarrier wave signal for deriving from a predetermined phase thereof a modulation component representing said proportions of said subcarrier wave signal required by said apparatus at said harmonic frequency and responsive to said harmonic signal for utilizing said derived component to modulate said developed harmonic signal; and a circuit for applying said first signal, said modified subcarrier wave signal, and said modulated harmonic signal to said apparatus for reproducing a color image.

13. An image-reproducing system for a color-television receiver comprising: a circuit for supplying an NTSC color signal including a first signal primarily representative of the brightness and a modulated subcarrier wave signal representative of the chromaticity of a televised image; color-image-reproducing apparatus including a multicolor image screen and means for scanning said screen with an electron beam, said scanning means including means for conditioning said apparatus, to develop a plurality of colors in a sequence repeating at a predetermined frequency, said apparatus requiring proportions of said subcarrier wave signal at a harmonic of said predetermined frequency to reproduce a color image; a signal-modifying circuit responsive to said supplied subcarrier wave signal and including means for selectively translating a portion of said supplied subcarrier wave signal at a predetermined phase thereof for developing from said translated portion a modified subcarrier wave signal modulated by the modulation component at said predetermined phase of said supplied subcarrier wave signal; means for developing a signal which is a harmonic of said predetermined frequency; a signal-modifying circuit responsive to said supplied subcarrier wave signal for deriving from a predetermined phase thereof a modulation component representing said proportions of said subcarrier wave signal required by said apparatus at said harmonic frequency and responsive to said harmonic signal for utilizing said derived component to modulate said developed harmonic signal; and a circuit for applying said first signal, said modified subcarrier wave signal, and said modulated harmonic signal to said apparatus for reproducing a color image.

14. An image-reproducing system for a color-television receiver comprising: a circuit for supplying an NTSC color signal including a first signal primarily representative of the brightness and a modulated subcarrier wave signal representative of the chromaticity of a televised image; color-image-reproducing apparatus including a multicolor image screen and means for scanning said screen with an electron beam, said scanning means including means for conditioning said apparatus to develop a plurality of colors in a sequence repeating at a predetermined frequency, said apparatus requiring proportions of said subcarrier wave signal at a harmonic of said predetermined frequency to reproduce a color image; a signal-modifying circuit responsive to said supplied subcarrier wave signal for developing therefrom another subcarrier wave signal modified with respect thereto and modulated at a predetermined phase by a selected one of the modulation components of said supplied subcarrier wave signal; means for developing a signal which is a harmonic of said predetermined frequency; a signal-modifying circuit responsive to said supplied subcarrier wave signal including a detector for deriving from a predetermined phase of said supplied wave signal a modulation component representing said proportions of said subcarrier wave signal required by said apparatus at said harmonic frequency and responsive to said harmonic signal and including a modulator for utilizing said derived component to modulate said developed harmonic signal; and a circuit for applying said first signal, said modified subcarrier wave signal, and said modulated harmonic signal to said apparatus for reproducing a color image.

15. An image-reproducing system for a color-television receiver comprising: a circuit for supplying an NTSC color signal including a first signal primarily representative of the brightness and a modulated subcarrier wave signal representative of the chromaticity of a televised image; color-image-reproducing apparatus including a multicolor image screen and means for scanning said screen with an electron beam, said scanning means including means for conditioning said apparatus to develop a plurality of colors in a sequence repeating at a predetermined frequency, said apparatus requiring proportions of said subcarrier wave signal at a harmonic of said predetermined frequency to reproduce a color image; a signal-modifying circuit coupled to said supply circuit and responsive to said first and said supplied subcarrier wave signals for developing a signal from said supplied subcarrier wave signal and including means for combining said developed signal with said first signal to develop a modified first signal; another signal-modifying circuit responsive to said supplied subcarrier wave signal for developing therefrom another subcarrier wave signal modified with respect thereto and modulated at a predetermined phase by a selected one of the modulation components of said supplied subcarrier wave signal; means for developing a signal which is a harmonic of said predetermined frequency; a third signal-modifying circuit responsive to said supplied subcarrier wave signal including a detector for deriving from a predetermined phase of said supplied wave signal a modulation component representing said proportions of said subcarrier wave signal required by said apparatus at said harmonic frequency and responsive to said harmonic signal and including a modulator for utilizing said derived component to modulate said developed harmonic signal; and a circuit for applying said modified first signal, said modified subcarrier wave signal, and said modulated harmonic signal to said apparatus for reproducing a color image.

16. An image-reproducing system for a color-television receiver comprising: a circuit for supplying an NTSC color signal including a first signal primarily representative of the brightness and a modulated subcarrier wave signal representative of the chromaticity of a televised image; means for generating an unmodulated sine-wave signal; color-image-reproducing apparatus including a multicolor image screen and means for scanning said screen with an electron beam, said scanning means including means responsive to said generated signal for conditioning said apparatus to develop a plurality of colors in a sequence repeating at a harmonic frequency of said generated signal, said apparatus requiring proportions of said subcarrier wave signal at said harmonic frequency to reproduce a color image; a signal-modifying circuit responsive to said generated signal and said supplied subcarrier wave signal for developing therefrom another subcarrier wave signal modified with respect thereto and modulated at a predetermined phase by a selected one of the modulation components of said supplied subcarrier wave signal; means responsive to said generated signal for developing a signal which is a harmonic thereof; another signal-modifying circuit responsive to said supplied subcarrier wave signal for deriving from a predetermined phase thereof a modulation component representing said proportions of said subcarrier wave signal required by said apparatus at said harmonic frequency and responsive to said harmonic signal for utilizing said derived component to modulate said developed harmonic signal; and a circuit for applying said first signal, said modified subcarrier wave signal, and said modulated harmonic signal to said apparatus for reproducing a color image.

17. An image-reproducing system for a color-television receiver comprising: a circuit for supplying an NTSC color signal including a first signal primarily representative of the brightness and a modulated subcarrier wave signal representative of the chromaticity of a televised image; means for generating an unmodulated sine-wave signal; color-image-reproducing apparatus including a multicolor image screen and means for scanning said screen with an electron beam, said scanning means including means responsive to said generated signal for conditioning said apparatus to develop a plurality of colors in a sequence repeating at a harmonic frequency of said generated signal, said apparatus requiring proportions of said subcarrier wave signal at said harmonic frequency to reproduce a color image; a signal-modifying circuit coupled to said supply circuit and said generating means and responsive to said first and said supplied subcarrier wave signals and said generated signal for developing a signal from said supplied subcarrier wave signal and including means for combining said developed signal with said first signal to develop a modified first signal; another signal-modifying circuit responsive to said generated signal and said supplied subcarrier wave signal for developing therefrom another subcarrier wave signal modified with respect thereto and modulated at a predetermined phase by a selected one of the modulation components of said supplied subcarrier wave signal; means responsive to said generated signal for developing a signal which is a harmonic thereof; a third signal-modifying circuit responsive to said supplied subcarrier wave signal for deriving from a predetermined phase thereof a modulation component representing said proportions of said subcarrier wave signal required by said apparatus at said harmonic frequency and responsive to said harmonic signal for utilizing said derived component to modulate said developed harmonic signal; and a circuit for applying said modified first signal, said modified subcarrier wave signal, and said modulated harmonic signal to said apparatus for reproducing a color image.

18. An image-reproducing system for a color-television receiver comprising: a circuit for supplying an NTSC color signal including a first signal primarily representative of the brightness and a modulated subcarrier wave signal representative of the chromaticity of a televised image; color-image-reproducing apparatus including a multicolor image screen and means for scanning said screen with an electron beam, said scanning means including means for conditioning said apparatus to develop a plurality of colors in a sequence repeating at a predetermined frequency, said apparatus requiring proportions of said subcarrier wave signal at the second harmonic of said predetermined frequency to reproduce a color image; a signal-modifying circuit responsive to said supplied subcarrier wave signal for deriving therefrom a pair of modulation components thereof and including means for utilizing said derived components to develop a modified subcarrier wave signal modulated at a predetermined phase by another one of the modulation components of said supplied subcarrier wave signal and having second harmonic components; means for developing a signal which is a second harmonic of said predetermined frequency; a signal-modifying circuit responsive to said supplied subcarrier wave signal for deriving a modulation component from a predetermined phase thereof and responsive to said harmonic signal for utilizing said derived component to modulate said developed harmonic signal; and a circuit for applying said first signal, said modified subcarrier wave signal and its second harmonic components, and said modulated harmonic signal to said apparatus for reproducing a color image.

References Cited in the file of this patent

UNITED STATES PATENTS

| | | |
|---|---|---|
| 2,635,140 | Dome | Apr. 14, 1953 |
| 2,657,257 | Lesti | Oct. 27, 1953 |
| 2,664,562 | Bedford | Dec. 29, 1953 |
| 2,677,720 | Bedford | May 4, 1954 |
| 2,677,721 | Bedford | May 4, 1954 |
| 2,692,532 | Lawrence | Oct. 26, 1954 |
| 2,734,940 | Loughlin | Feb. 14, 1956 |
| 2,744,952 | Lawrence | May 8, 1956 |